United States Patent
Narayan

(10) Patent No.: US 9,499,261 B2
(45) Date of Patent: Nov. 22, 2016

(54) FRICTION-BASED SHIMMY DAMPER FOR LANDING GEAR

(71) Applicant: Goodrich Corporation, Charlotte, NC (US)

(72) Inventor: Karthik Narayan, Mississauga (CA)

(73) Assignee: GOODRICH CORPORATION, Charlotte, NC (US)

( * ) Notice: Subject to any disclaimer, the term of this patent is extended or adjusted under 35 U.S.C. 154(b) by 158 days.

(21) Appl. No.: 14/600,623

(22) Filed: Jan. 20, 2015

(65) Prior Publication Data

US 2016/0207615 A1    Jul. 21, 2016

(51) Int. Cl.
*B64C 25/50*    (2006.01)
*B64C 25/34*    (2006.01)

(52) U.S. Cl.
CPC ............. *B64C 25/505* (2013.01); *B64C 25/34* (2013.01)

(58) Field of Classification Search
CPC .............................. B64C 25/505; B64C 25/34
See application file for complete search history.

(56) References Cited

U.S. PATENT DOCUMENTS

| | | | | | |
|---|---|---|---|---|---|
| 2,624,534 | A | * | 1/1953 | Geisse | B64C 25/505 244/103 R |
| 2,849,199 | A | * | 8/1958 | Lucien | B64C 25/505 188/322.14 |
| 2003/0223659 | A1 | * | 12/2003 | Lee | F16F 7/082 384/36 |
| 2006/0278755 | A1 | * | 12/2006 | Bachmeyer | B64C 25/505 244/50 |
| 2009/0224100 | A1 | * | 9/2009 | Luce | B64C 25/505 244/104 R |

FOREIGN PATENT DOCUMENTS

| CA | 2067213 | 3/1992 |
|---|---|---|
| GB | 223826 | 10/1924 |

OTHER PUBLICATIONS

Extended European Search Report dated Jun. 1, 2016 in European Application No. 16151915.2.

* cited by examiner

*Primary Examiner* — Justin Benedik
(74) *Attorney, Agent, or Firm* — Snell & Wilmer L.L.P.

(57) ABSTRACT

A system for damping vibration and/or shimmy of a landing gear system is disclosed. The system is a friction-based damping system that utilizes a friction pad and friction wedge to dampen vibration and/or shimmy. The friction pad may be coupled to an apex pin that is used to couple a first torque link and a second torque link together. The friction wedge may be a made of a wearable and/or consumable material.

16 Claims, 4 Drawing Sheets

FRICTION-BASED SHIMMY DAMPER FOR LANDING GEAR

FIELD

The present disclosure relates generally to landing gear assemblies and more specifically, to systems for damping shimmy vibrations in landing gear assemblies.

BACKGROUND

Conventionally, various types of aircraft utilize landing gear which include a device or component designed to reduce wheel oscillations (also referred to as "shimmy") when the landing gear is in contact with the ground. Wheel shimmy is a condition in which an aircraft wheel or wheels oscillate from side to side perpendicular to the direction of travel of the aircraft and/or rotates back and forth about the landing gear strut centerline. Wheel shimmy can be caused by a number of conditions such as low torsional stiffness, excessive "free play" in the landing gear, wheel imbalance, and/or worn parts. Uncontrolled wheel shimmy may be detrimental to the aircraft structure.

Dampers, such as hydraulic dampers, have been used to damp wheel shimmy. For example, a hydraulic damper mounted between components of the landing gear that have a tendency to move relative to each other during wheel shimmy, such as torque links, may be used to damp shimmy. Hydraulic dampers may be associated with increased complexity, frequent maintenance, and may be sensitive to temperature fluctuations.

SUMMARY

A torque link assembly in accordance with various embodiments may comprise a first torque link and a friction-based damper coupled to the first torque link by an apex pin and comprising a friction pad configured to engage with a friction wedge coupled to a slider. The torque link assembly may further comprise a second torque link coupled to the first torque link by the apex pin. The friction-based damper may be surrounded by a casing. The friction pad may be coupled to the apex pin and comprise a groove configured to receive the friction wedge. The casing may comprise a cavity configured to receive the slider and a threaded portion configured to receive a nut and constrain the slider along an axis. One or more flexible elements (such as conical spring washers) may be positioned between the nut and the slider.

A landing gear assembly in accordance with various embodiments may comprise a first torque link coupled to a shock strut, a second torque link coupled to the first torque link and the shock strut, wherein the first torque link and the second torque link are coupled by an apex pin, and a friction pad coupled to the apex pin and configured to engage with a friction wedge coupled to a slider. The friction pad, friction wedge, and slider may be surrounded by a casing. The friction pad may comprise a groove configured to receive the friction wedge. The casing may comprise a cavity configured to receive the slider and a threaded portion configured to receive a nut and constrain the slider along an axis. One or more conical spring washers may be positioned between the nut and the slider.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
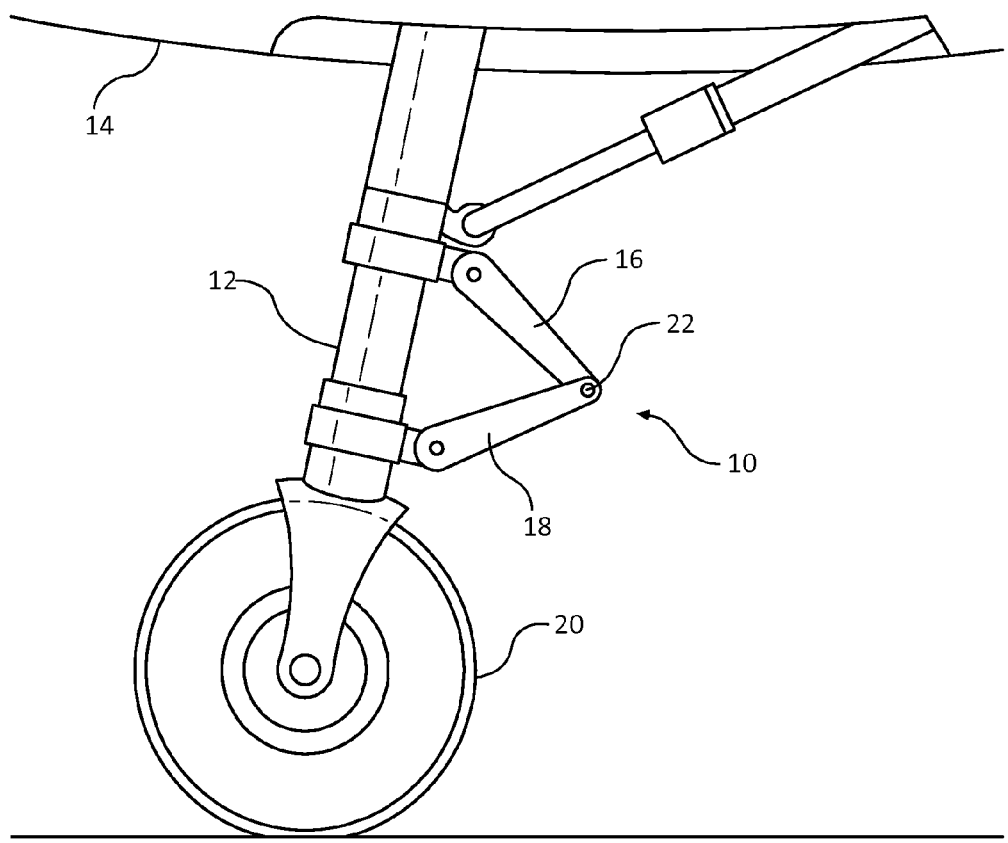
FIG. 1 illustrates a side view of a landing gear assembly in accordance with various embodiments.
Figure 1:
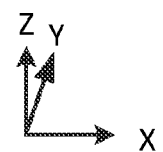

With initial reference to FIG. 1, a landing gear assembly 10 of an aircraft 14 is illustrated. In various embodiments, landing gear assembly 10 comprises a shock strut 12. Landing gear assembly 10 may further comprise a wheel 20 coupled to shock strut 12.

In various embodiments, landing gear assembly 10 comprises a first torque link 16 and a second torque link 18. For example, both torque links may be coupled to shock strut 12. Further, first torque link 16 may be coupled to second torque link 18. In various embodiments, first torque link 16 and second torque link 18 are coupled to each other by a friction-based damper system 22. First torque link 16, second torque link 18, and friction-based damper system 22 may form a torque link assembly. Friction-based damper system 22 may reduce and/or dampen vibrations and/or shimmy of landing gear assembly 10 in the fore-aft, torsional, and/or lateral directions of the landing gear assembly during operation.

With initial reference to FIGS. 2A-2E, a friction-based damper system 22 in accordance with various embodiments is illustrated. In various embodiments, friction-based damper system 22 is configured to reduce and/or dampen vibration and/or shimmy of landing gear assembly 10 during operation. Further, friction-based damper system 22 may be used in place of conventional hydraulic-based damper systems, which may reduce complexity, maintenance, and increase reliability of landing gear assembly 10.

In various embodiments, friction-based damper system 22 comprises an apex pin 24. Apex pin 24 may couple first torque link 16 and second torque link 18 while allowing both links to rotate relative to each other. In various embodiments, apex pin 24 may be coupled to one or more collars. For example, a collar 26B may be positioned between first torque link 16 and second torque link 18. Further, a collar 26A may be positioned on an end of apex pin 24 to secure first torque link 16 to apex pin 24. Although described with reference to the specific embodiments illustrated in FIGS. 2A-2D, any configuration of apex pin 24, first torque link 16, and second torque link 18 is within the scope of the present disclosure.

Friction-based damper system 22 may comprise a casing 40. Various components of friction-based damper system 22 may be partially or wholly enclosed within casing 40. Casing 40 may, for example, be coupled to second torque link 18. Further, casing 40 may be integral to first torque link 16.

In various embodiments, friction-based damper system 22 may further comprise a friction pad 28 coupled (removably or permanently) to apex pin 24 and located within casing 40. In various embodiments, friction pad 28 comprises a groove 30 configured to receive a friction component, such as, for example, a friction wedge 32. Friction wedge 32 may be configured to engage with groove 30. In that regard, oscillations from first torque link 16 and/or second torque link 18 may be transmitted to the friction pad 28 via the apex pin 24. Thus, the apex pin 24 and the friction pad 28 may move along the Y direction. In various embodiments, friction wedge 32 comprises a shape and/or configuration capable of engaging with and moving within groove 30. Such movement of friction wedge 32 within groove 30 may reduce vibration and/or shimmy of landing gear assembly 10. For example, friction wedge 32 may slide parallel to groove 30. In that regard, the friction between friction wedge 32 and groove 30 (and friction pad 28 generally) may dampen oscillations in the Y direction.

Friction wedge 32 may comprise a wearable material. For example, during operation of landing gear assembly 10, friction wedge 32 may be worn and/or consumed as friction wedge 32 moves with respect to friction pad 28. Friction wedge 32 may be replaced after sufficient wearing. Suitable materials for friction wedge 32 may comprise, for example, ceramics, carbon based materials, fiber reinforced composite materials, metals and alloys thereof, and combinations of such materials.

In various embodiments, friction wedge 32 is coupled to a slider 36. Slider 36 may comprise a cylindrical member that is coupled to friction wedge 32. In other embodiments, slider 36 may be integral to friction wedge 32. In various embodiments, casing 40 comprises a cavity 42 configured to receive and orient a portion of slider 36.

Casing 40 may further comprise a threaded portion 44 configured to receive a nut 46 in cavity 42. For example, nut 46 may engage with threaded portion 44 to retain slider 36 within cavity 42. In various embodiments, cavity 42 is configured to permit slider 36 to move upward and downward along a Z axis. In such embodiments, nut 46 prevents slider 36 from exiting cavity 42 in the Z direction.

Figure 2A:
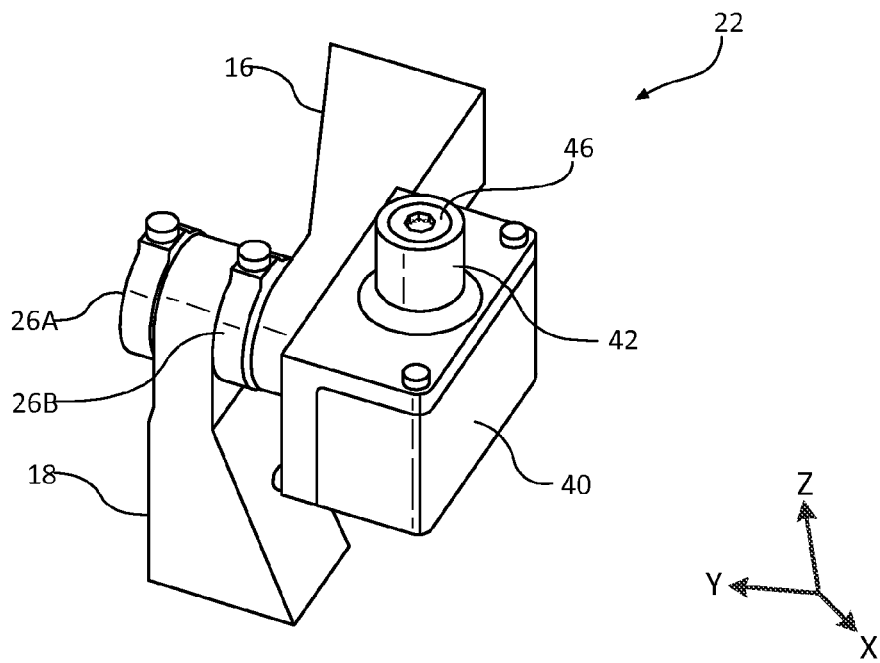
FIGS. 2A, 2B, 2C, 2D, and 2E illustrate, respectively, three perspective views of a damper, a perspective view of an apex pin, and a cross sectional view of a damper through the friction wedge and slider in accordance with various embodiments.
Figure 2B:
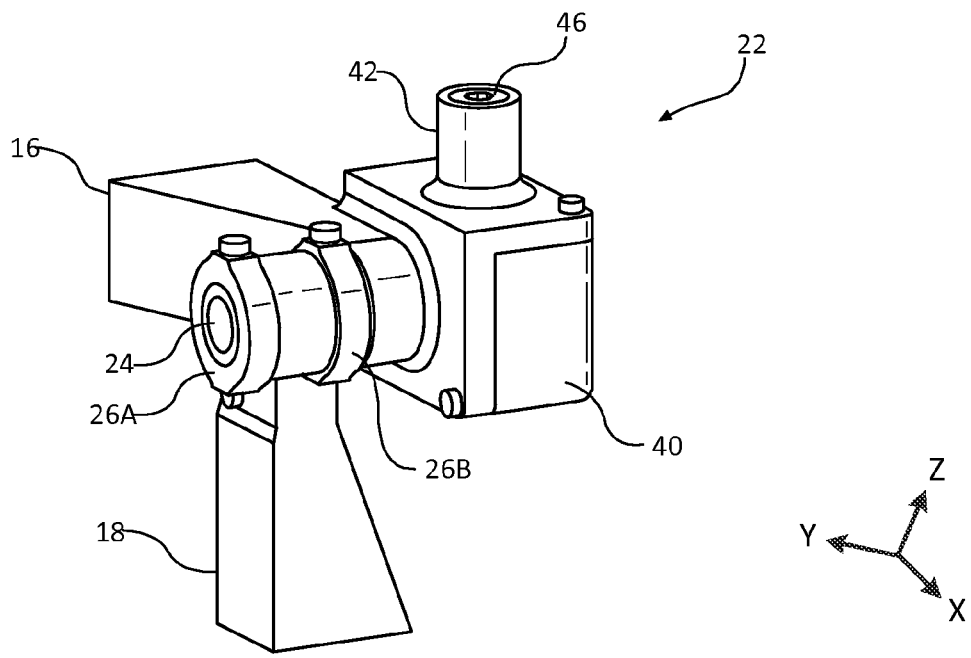
Figure 2C:
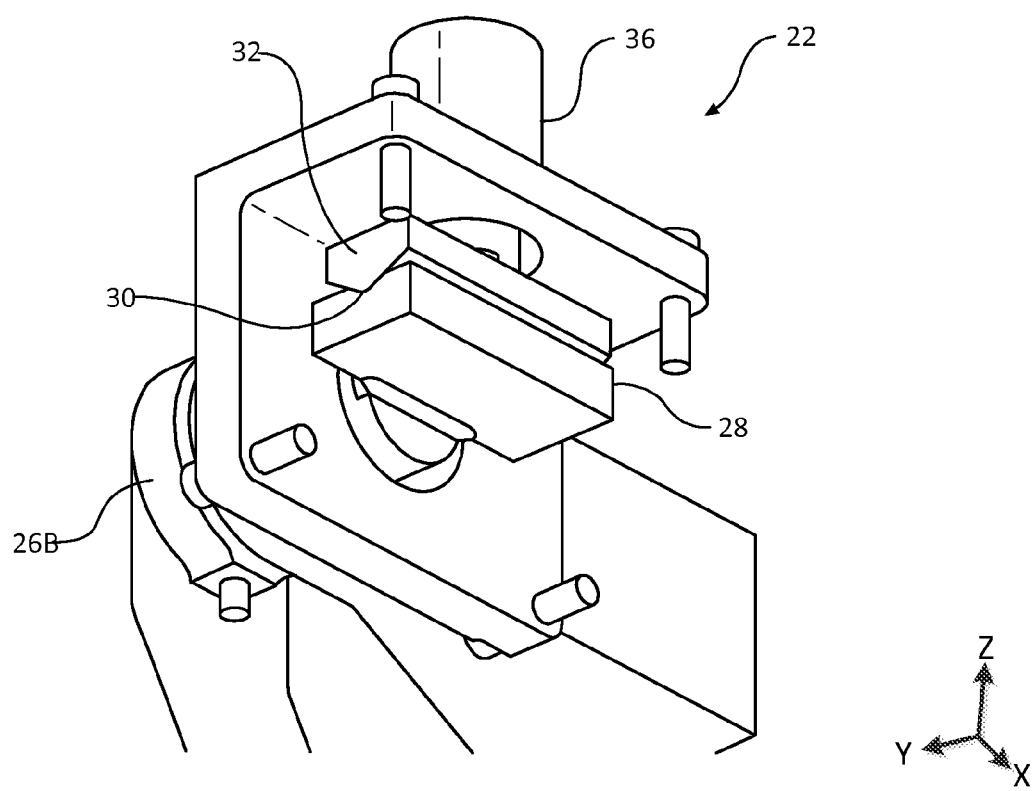
Figure 2D:
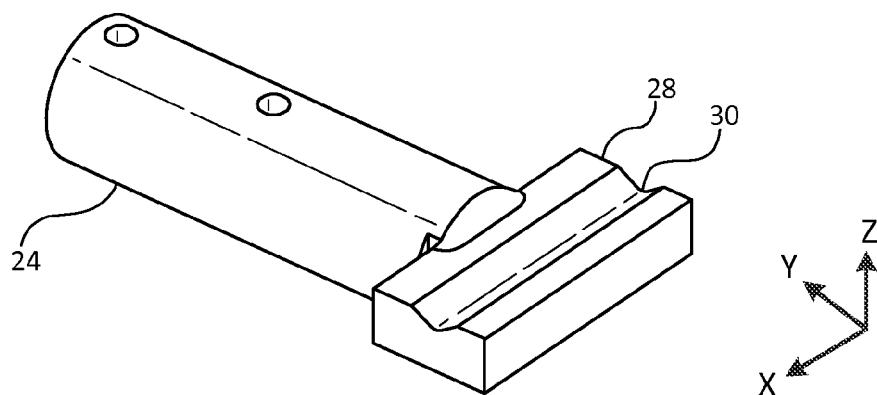
Figure 2E:
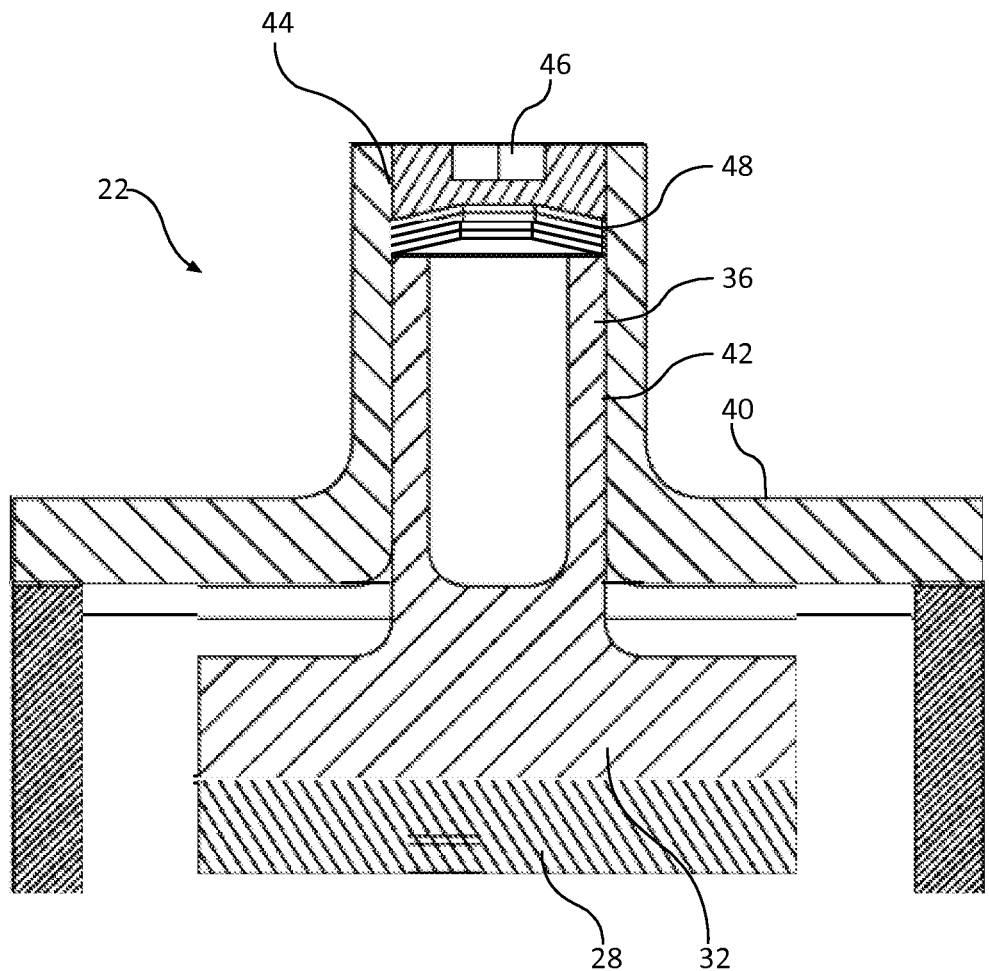

As illustrated in FIG. 2E, in various embodiments, friction-based damper system 22 further comprises one or more washers 48. Washers 48 may, for example, be positioned between nut 46 and slider 36. In various embodiments, washers 48 may comprise conical spring washers (e.g., Belleville washers) configured to provide downward (i.e., in the negative Z direction) spring force against slider 36. For example, washers 48 may provide spring force against slider 36 to help maintain contact between friction wedge 32 and friction pad 28, as well as dampen movement of slider 36 along the Z axis by providing a stabilizing and consistent downward spring force. Further, the movement of slider 36 along the Z axis may be tuned by selecting an appropriate type of washers, number of washers, and torque of nut 46 to achieve the desired level of friction and damping.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A torque link assembly comprising:
   a first torque link;
   a second torque link coupled to the first torque link via an apex pin;
   a friction pad coupled to one end of the apex pin; and
   a friction wedge mounted to at least one of the first torque link and the second torque link;
   wherein the friction pad is configured to engage with the friction wedge to dampen relative movement between the first torque link and the second torque link.

2. The torque link assembly of claim 1, wherein the friction pad is configured to engage the friction wedge to dampen oscillations along the apex pin.

3. The torque link assembly of claim 1, further comprising a casing mounted to the one of the first torque link and the second torque link, wherein the casing surrounds the friction wedge and the friction pad.

4. The torque link assembly of claim 1, wherein the friction pad is integral to the apex pin.

5. The torque link assembly of claim 1, wherein the friction pad comprises a groove configured to receive the friction wedge.

6. The torque link assembly of claim 3, wherein:
the friction wedge is coupled to a slider;
the slider is slidably mounted to the casing; and
the casing comprises a cavity configured to receive the slider.

7. The torque link assembly of claim 6, wherein the casing comprises a threaded portion configured to receive a nut and constrain the slider along an axis.

8. The torque link assembly of claim 7, further comprising a flexible element positioned between the nut and the slider.

9. The torque link assembly of claim 8, wherein the flexible element comprises a conical spring washer.

10. A landing gear assembly comprising:
a first torque link coupled to a shock strut;
a second torque link coupled to the first torque link and the shock strut, wherein the first torque link and the second torque link are coupled together by
an apex pin; and
a friction pad coupled to the apex pin; and
a friction wedge coupled to a slider, wherein the slider is slidably mounted to one of the first torque link and the second torque link;
wherein the friction pad is configured to engage with the friction wedge to dampen shimmy in the landing gear assembly.

11. The landing gear assembly of claim 10, further comprising a casing surrounding the friction pad, the friction wedge, and the slider.

12. The landing gear assembly of claim 10, wherein the friction pad comprises a groove configured to receive the friction wedge.

13. The landing gear assembly of claim 11, wherein the casing comprises a cavity configured to receive the slider.

14. The landing gear assembly of claim 13, wherein the casing comprises a threaded portion configured to receive a nut and constrain the slider along an axis.

15. The landing gear assembly of claim 14, further comprising at least one flexible element positioned between the nut and the slider.

16. The landing gear assembly of claim 10, wherein the friction pad is configured to engage with the friction wedge to dampen oscillations along the apex pin.

* * * * *